(12) United States Patent
Reed

(10) Patent No.: US 9,384,279 B2
(45) Date of Patent: Jul. 5, 2016

(54) METHOD AND SYSTEM FOR PREVIEWING SEARCH RESULTS

(71) Applicant: Charles Reed, Jackson, NJ (US)

(72) Inventor: Charles Reed, Jackson, NJ (US)

(*) Notice: Subject to any disclaimer, the term of this patent is extended or adjusted under 35 U.S.C. 154(b) by 138 days.

(21) Appl. No.: 14/098,770

(22) Filed: Dec. 6, 2013

(65) Prior Publication Data

US 2014/0164348 A1    Jun. 12, 2014

Related U.S. Application Data

(60) Provisional application No. 61/734,681, filed on Dec. 7, 2012.

(51) Int. Cl.
  *G06F 7/00*    (2006.01)
  *G06F 17/00*   (2006.01)
  *G06F 17/30*   (2006.01)

(52) U.S. Cl.
  CPC .................. *G06F 17/30864* (2013.01)

(58) Field of Classification Search
  CPC ............ G06F 17/30749; G06F 17/30761; G06F 17/30905; G06F 17/30867; G06F 17/30899; G06F 17/30991
  See application file for complete search history.

(56) References Cited

U.S. PATENT DOCUMENTS

| | | | |
|---|---|---|---|
| 6,169,986 B1 | 1/2001 | Bowman et al. | |
| 6,711,565 B1 | 3/2004 | Subramaniam et al. | |
| 6,772,150 B1 | 8/2004 | Whitman et al. | |
| 6,834,371 B1* | 12/2004 | Jensen et al. | 715/255 |
| 7,516,124 B2 | 4/2009 | Kasperski | |
| 7,752,237 B2 | 7/2010 | Ray | |
| 8,145,630 B1 | 3/2012 | Garg et al. | |
| 8,150,869 B2 | 4/2012 | Jamil et al. | |
| 8,271,546 B2 | 9/2012 | Gibbs | |
| 8,280,901 B2 | 10/2012 | McDonald | |
| 2006/0155728 A1* | 7/2006 | Bosarge | 707/100 |
| 2007/0157129 A1 | 7/2007 | Facemire et al. | |
| 2008/0022229 A1* | 1/2008 | Bhumkar et al. | 715/838 |

(Continued)

FOREIGN PATENT DOCUMENTS

| | | |
|---|---|---|
| JP | 2009009381 A | 1/2009 |
| JP | 2011014101 A | 1/2011 |
| WO | WO-2007024645 A2 | 3/2007 |

OTHER PUBLICATIONS

Examining the Effectiveness of Real-Time Query Expansion; Ryen W. White and Gary Marchionini; Information Processing & Management 43.3 (2007): 685-704.

(Continued)

*Primary Examiner* — Susan Chen
(74) *Attorney, Agent, or Firm* — Fox Rothschild LLP

(57) ABSTRACT

A method for providing a search sample without a search being triggered is disclosed. The method includes receiving at least one partial search term in a search box. Probable search terms are determined by comparing the at least one partial search term to a database of common search terms. The probable search terms are displayed in a format that include a link to a sample search of each probable search term and a backslide button. When the link to a sample search of a probable search term is selected in the probable search terms, the sample search is displayed in a format that includes a close link. When the close link is selected in the sample search, the probable search terms are displayed again. When the backslide button is selected, the right most word from the search term is deleted.

10 Claims, 5 Drawing Sheets

(56) References Cited

U.S. PATENT DOCUMENTS

| | | |
|---|---|---|
| 2009/0037406 A1 | 2/2009 | Blackwell et al. |
| 2009/0043741 A1 | 2/2009 | Kim |
| 2009/0076843 A1* | 3/2009 | Graff et al. .................. 705/2 |
| 2009/0083232 A1 | 3/2009 | Ives et al. |
| 2009/0313100 A1 | 12/2009 | Ingleshwar |
| 2010/0146012 A1 | 6/2010 | Beaudreau et al. |
| 2011/0151426 A1* | 6/2011 | Oberg .......................... 434/350 |
| 2011/0154194 A1* | 6/2011 | Mathai et al. ................. 715/273 |
| 2011/0314021 A1 | 12/2011 | Gibbs et al. |
| 2012/0047135 A1 | 2/2012 | Hansson et al. |
| 2013/0080423 A1 | 3/2013 | Parikh et al. |
| 2013/0117258 A1 | 5/2013 | Linsley et al. |
| 2013/0159923 A1 | 6/2013 | French et al. |
| 2013/0198174 A1 | 8/2013 | Poznanski et al. |
| 2013/0275422 A1 | 10/2013 | Silber et al. |

OTHER PUBLICATIONS

Interactive Search Support for Difficult Web Queries; Abdigani Diriye, Giridhar Kumaran, and Jeff Huang; Advances in INformation Retriefal. Springer Berlin Heidelberg, 2012. 37-49.

Efficient Type-Ahead Search on Relational Data: A Tastier Approach; Li Guoliang; Ji Shengyue; Li Chen and Feng Jianhua; Proceedings of the 2009 ACM SIGMOD International Conference on Management of Data. ACM 2009.

* cited by examiner

METHOD AND SYSTEM FOR PREVIEWING SEARCH RESULTS

REFERENCE TO RELATED APPLICATIONS

This application is a non-provisional application claiming priority to U.S. Provisional Patent Application Ser. No. 61/734,681 filed Dec. 7, 2012, which is hereby incorporated by reference as if fully disclosed herein.

FIELD OF THE DISCLOSURE

The present disclosure relates to previewing search results. More specifically, the present disclosure relates to methods and systems of previewing search results from an autocomplete list without and/or prior to executing a full search on the search terms.

BACKGROUND

The many, if not all, modern search engines provide no method to cancel the auto-completion of a search. Once the user has clicked on an auto-complete search option, a full search is returned on the auto-completed search term. If another search is required, the user must execute the search again. Further, as modern computer devices get smaller, applications require more efficient uses of screen real estate. Also, with additional restrictions placed on mobile internet, efficient use of available bandwidth becomes an important concern.

U.S. Patent Application Publication No. 2013/0159923, titled "Previewing Web Pages Associated with Search Results," describes methods and systems for previewing search results determined in response to search queries input into a browser toolbar search box. In U.S. Pat. No. 8,150,869, titled "Combined Web Browsing and Searching," describes methods and systems for displaying a web page and search results based on a user-entered query term in the same window concurrently. However, conventional solutions do not offer any improvements in bandwidth efficiency.

SUMMARY

A method and system is disclosed that allows a user to quickly change the search results entered into a user interface input field without requiring a new search or requiring that the complete search fully loads. A "preview" button is placed next to each of the auto-complete suggested search terms in the user interface. Selection of this button for a suggested search term causes a computing device to display the first few of highest rated search results for that search term. If these results do not appear to be what the user is looking for, selection of the "Close" button causes the device to re-display the auto-complete results. Additionally, it also provides a button on the search results page which will allow the user to start a new search at the point in which they selected an auto-complete result.

A system for providing a preview search of a probable search term prior to executing a full search that includes a server and a user computing device. The server includes an electronic circuit and is configured to receive at least one partial search term entered in the search box at a user computing device, determine a plurality of probable search terms by comparing the at least one partial search term to a database of common search terms, and transmit the plurality of probable search terms to the user computing device.

The user computing device includes an electronic circuit and is configured to display the search box and receive input of at least one partial search term in the search box, transmit the at least one partial search term to the server, receive the plurality of probable search terms, display the plurality of probable search terms received from the server in a format that include a preview link associated with each probable search term that executes a preview search of the associated probable search term, and display a preview search of a selected probable search term in a format that includes a run search link, wherein the preview includes links to a plurality of web content associated with the selected probable search term, and wherein selecting one of the links causes a corresponding item of web content to be loaded.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
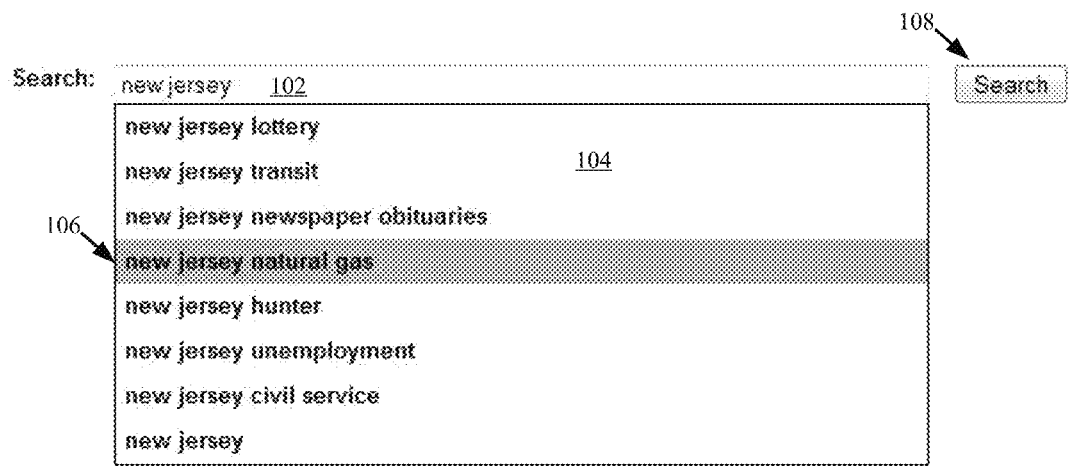
FIG. 1 shows a typical search box with probable search terms.

FIG. 1 shows a conventional search box 102 along with example auto complete options 104. As shown in FIG. 1, "new jersey" has been entered into the search box 102. A user may select the search button 108 or one of the auto complete options 104 to have the corresponding search be performed. With conventional search boxes, such as search box 102 of FIG. 1, once a search has been performed there is no way to return to the probable search terms, such probable search terms 104 shown in FIG. 1. For example, if the user were to click the back button in their browser, they would be presented with an empty search box. Therefore, a need exists to provide a preview of the search that would be returned if the user were to select one of the probable search terms.

To conserve bandwidth and screen space, a method and system is disclosed to allow a user to preview search results for particular probable search terms. Advantageously, a preview can be viewed and discarded without requiring a new full search or navigation through the search results. This conserves bandwidth and provides for efficient searching in bandwidth constrained environments.

Figure 2:
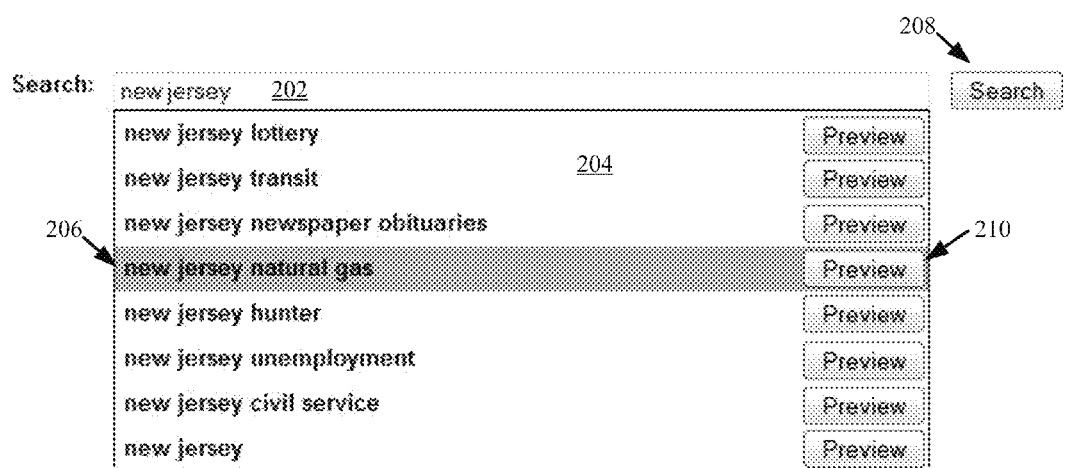
FIG. 2 shows probable search terms with a search preview option.

An example search box 202 that utilizes an auto-complete result preview feature is shown in FIG. 2. In addition to search box 202, a list of probable search terms 204 is provided. In the embodiment of FIG. 2, next to each of the probable search terms 204 is a preview button 210. Similar to a conventional auto-complete feature, such as that shown in FIG. 1, a list of popular searches is shown to the user. Clicking on any of the auto-complete results, for example result 206, will generate a search result page for that query. For example, selecting "new jersey lottery" will generate a full search result for those search terms. However, if the preview button 210 next to an auto-complete option is selected, a preview search or sample search is displayed which includes the top search results for the search terms, as described in more detail below in reference to FIG. 3. In an example scenario, as shown in FIG. 2, "new jersey natural gas" auto-complete option 206 is selected. In this example, selecting the auto-complete option for "new jersey natural gas" will return a search result for that search term. Selecting the preview for the "new jersey natural gas" auto-complete option generates a preview or sampler of the search result.

Figure 3:
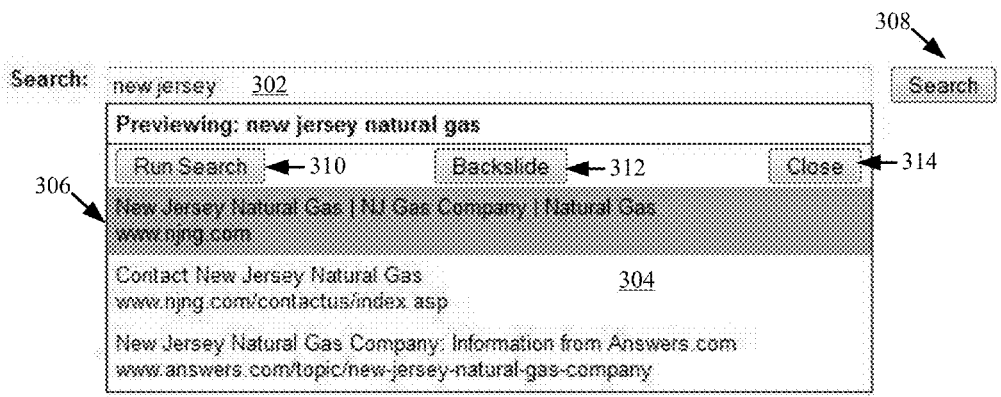
FIG. 3 shows an example of a search sample box of a selected auto-complete search term.

Referring now to FIG. 3, a search box 302 displays a sample search preview 304 of a search term from the list of probable search terms 204 shown in FIG. 2. As shown in FIG. 3, the search term in this example is "new jersey natural gas" autocomplete option 206, as selected in the example described above in reference to FIG. 2. In FIG. 3, however, a sample search preview 304 is shown for the terms "new jersey natural gas." In this example, the top results for the search term "new jersey natural gas" are shown in sample search preview 304. If the user selects the run search button 310, a full search for "new jersey natural gas" (i.e., the previewed search term) is executed and the search results page is displayed. In contrast, if the search button 308 is selected, a full search is run for "new jersey" (i.e., the search terms actually entered by the user into search box 302). If, however, one of the preview results is selected, e.g. the preview result 306 for New Jersey Natural Gas as selected in FIG. 3, the web page corresponding to that preview result is displayed in the browser window. If the close button 314 is selected the probable search terms are redisplayed as shown in FIG. 2.

Figure 4A:
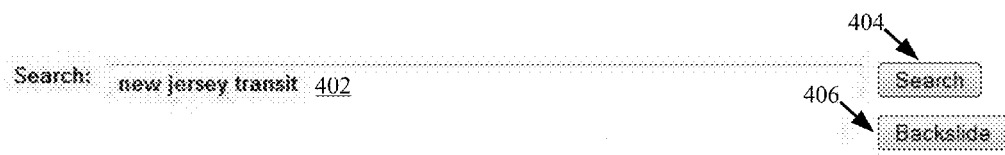
FIGS. 4A-B show a search box with a backslide function.
Figure 4B:
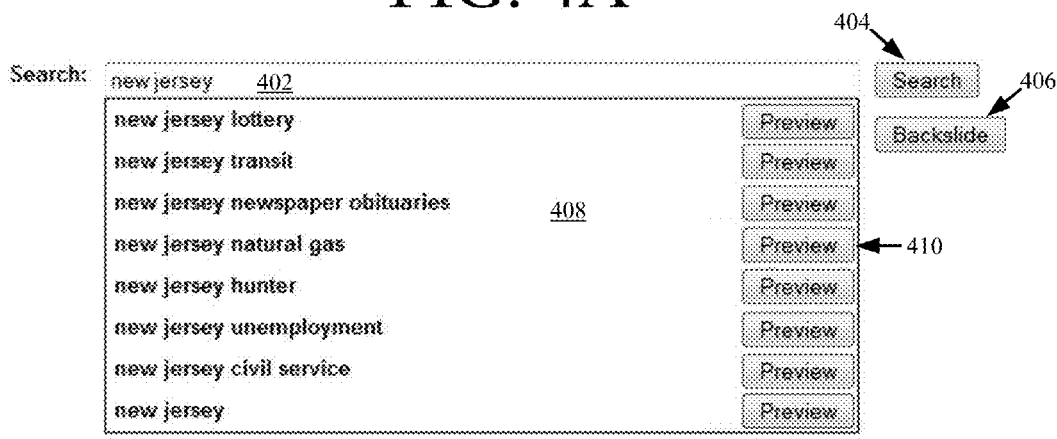

Once a user has requested a full search and has been taken to the results page, he or she may decide that the search they requested was not the best search after all. A second aspect of the search sample is the "backslide" button 312, 406 found on the search sample and the search results page, as shown in FIGS. 3 and 4A-4B. When this button is clicked, the contents of the search box at the top of the page are returned to a previous state.

An example scenario is illustrated in FIGS. 4A-4B. In this scenario, the results page is shown in FIG. 4A. For simplicity and clarity, the actual results are omitted and only the search box 402 is shown. If the user selected an auto-complete result, the contents are returned to how they appeared before the user selected an auto-complete option. For example, if the full search for "new jersey natural gas" auto-complete option 206 is selected in the example given above in reference to FIG. 2, the full search results for "new jersey natural gas" would be displayed. Selecting backslide 406 will return the search box 402 to "new jersey" showing the probable search terms 408, as shown in FIG. 4B. Alternatively, the full results for "new jersey natural gas" may also be generated by selecting the run search button 310 on a search sample, such as that shown in FIG. 3. Selecting backslide 406 in this circumstance will again return the search box 402 to "new jersey" showing the search preview options 408.

In another scenario and referring again to FIG. 3, selecting backslide 312 would display autocomplete results like that in FIG. 4B, but for the partial search terms "New Jersey Natural."

Figure 5:
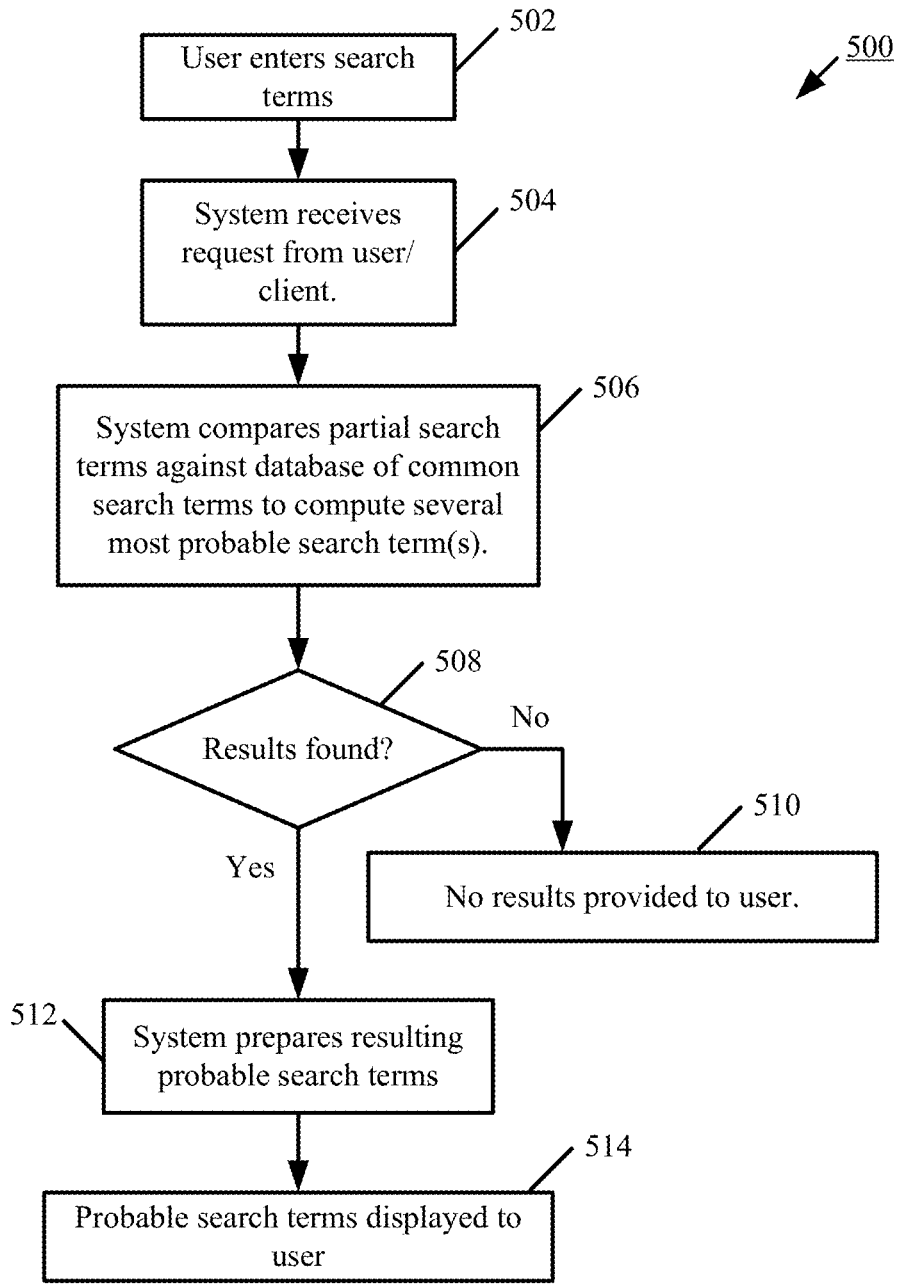
FIG. 5 is a flow diagram of an example process for generating a list of probable search terms.

Referring now to FIG. 5, a flow chart depicting process 500 is shown. In step 502, a user begins entering search terms. In step 504, the system receives a partial search term request from the user/client. In step 506, the system compares partial search terms against a data base of common search terms to compute the top most probable search terms. For auto-complete functionality, the system determines, in step 508, whether any results were found in the database. If no results were found (508: No), then the system prepares a statement that no search terms were found, in step 510. In step 514, the statement is returned to the user. Alternatively, if results are found (508: Yes), then the system prepares, in step 512, a list of probable search terms that include a link to the search page of each search term as well as a link to a sample search of each search term. In an embodiment, e.g. FIG. 2, the link to the sample search is provided through a "preview" button embedded in the auto-complete results. In step 514, the list is returned to the user.

Figure 6:
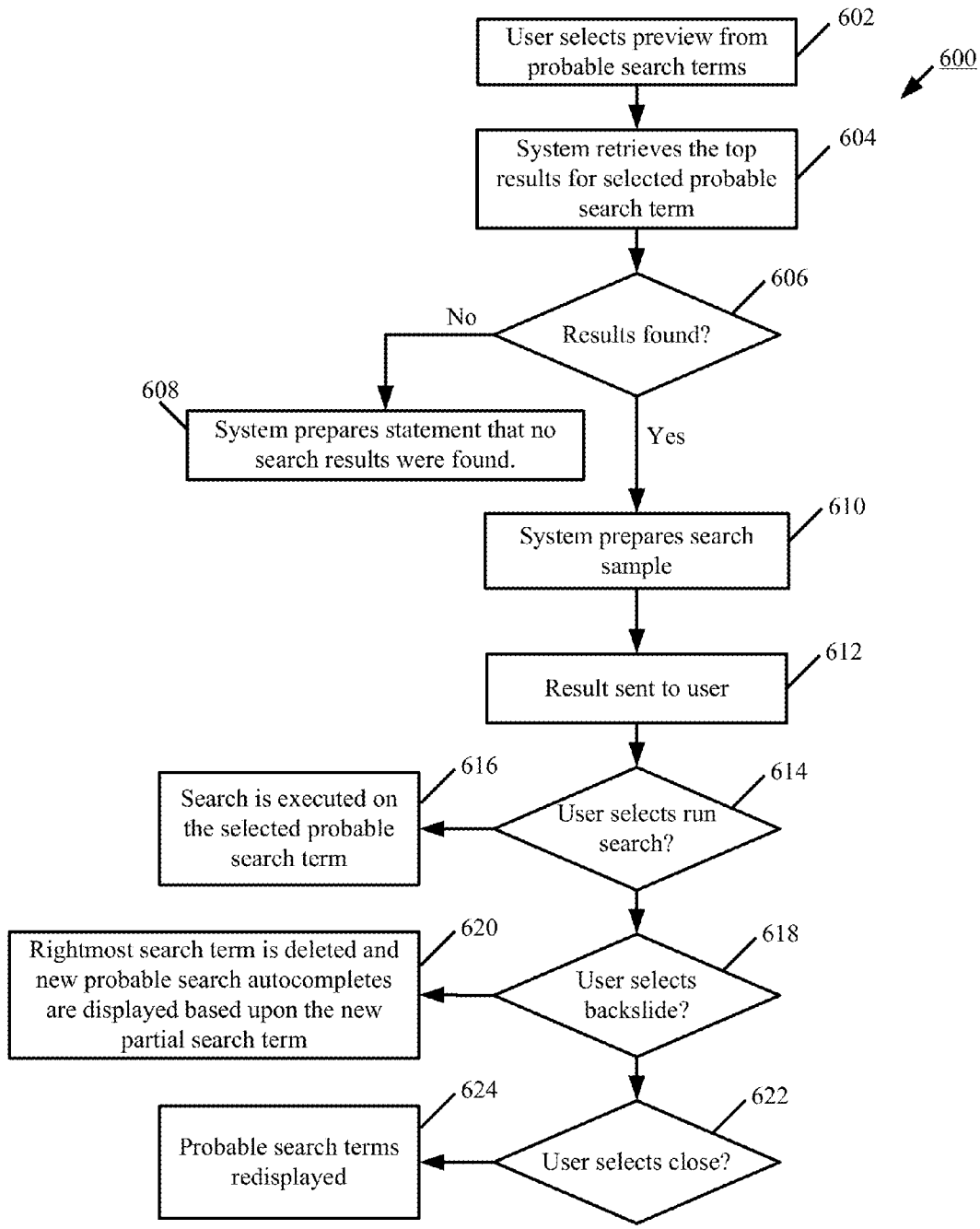
FIG. 6 is a flow diagram of an example process for previewing search results from a list of probable search terms.

As noted above, the list may contain a link to a sample search for each returned search term. In an example, if a user would like to see a sample of a search that would be returned upon selection of that search term, the user may select the preview or search sample. Referring now to FIG. 6, a user selects a preview search 602. The system retrieves the top results for the search term for which the sample is requested 604. The system determines, in step 606, whether any results are found for the sample search. If not (606: No), the system prepares a statement that no search results are found, similar to that in step 608. One of ordinary skill will note that this would be unlikely since an auto-complete search term was used for the search sample input, however, it is possible that no results will be returned. Alternatively, if results are found (606: Yes), the system prepares a list of the best search results in step 610 and returns the results to the user 612.

The user may select a run search link 614, a backslide link 618, or a close link 622. If the user selects the run search link (614: Yes), a search is executed based on the selected probable search term for which the preview search is displayed 616. In the example shown in FIG. 3, the full search would be run on "new jersey natural gas." If the user selects the backslide link (618: Yes), the rightmost term of the selected probable search term is removed and a new list of autocompletes, for the previously selected probable search terms with the rightmost term removed, is provided 620. If the user selects the close link (622: Yes), the probable search terms from the previous list are redisplayed 624.

Figure 7:
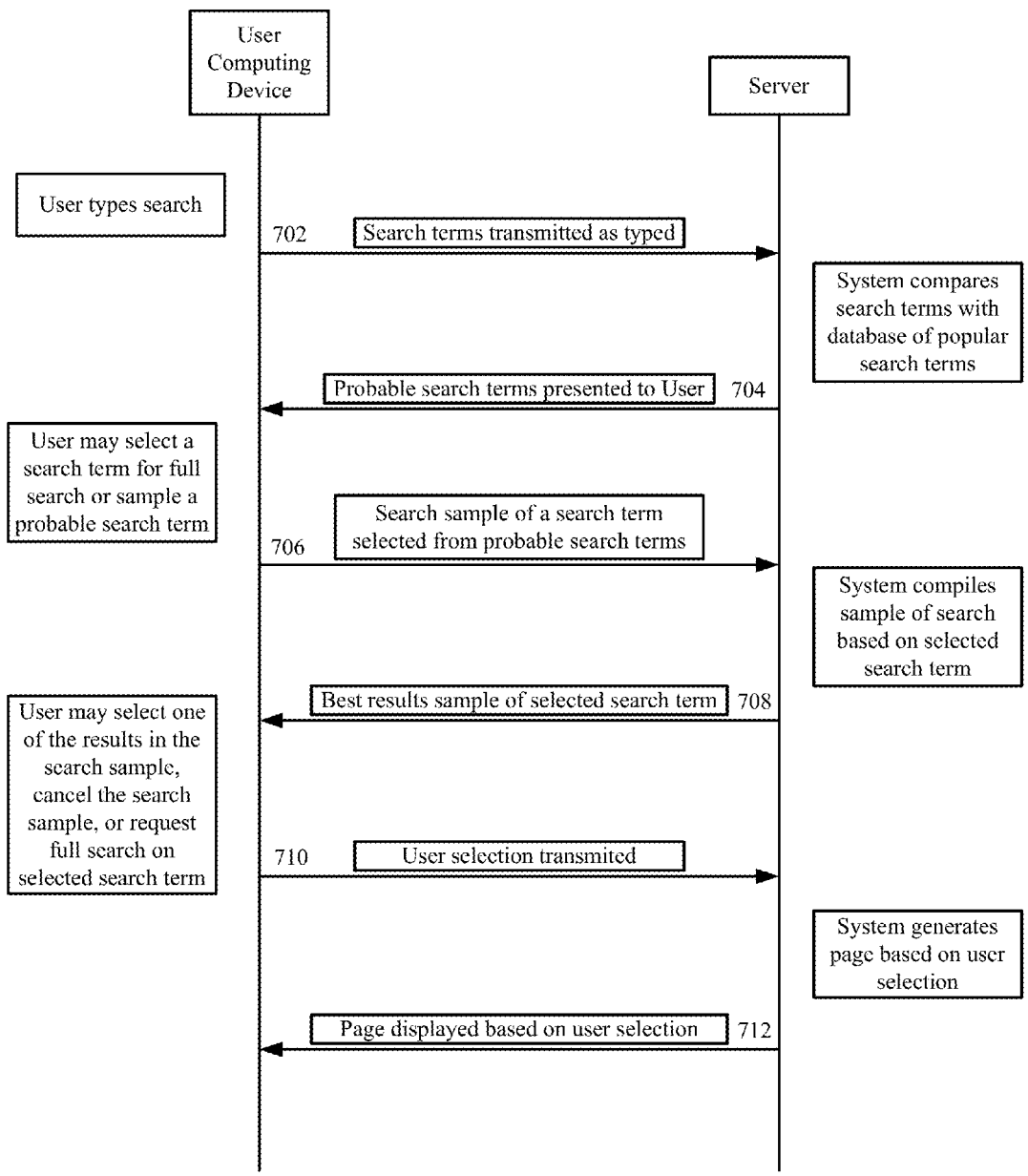
FIG. 7 is a chart showing an example message flow between a user and a search system.

Referring now to FIG. 7, a diagram is provided that illustrates an exemplary interaction between the user and the search sampler system. As shown in the diagram, when the user types a search, the search terms are transmitted from the user to the system in or near real-time 702. One of ordinary skill will note that the transmission may be to a remote system (e.g. a web-server) or may be to a local process on the same machine as the user (e.g. an application running on the user's computer). The embodiments are not limited in this regard. After the search terms are transmitted, the system compares the search terms to a database of popular search terms. The probable search terms are then presented to the user 704. A number of options are available to the user at this point. For example, a user may select a probable search term for a full search or search sample of a probable search term. In embodiments, a search sample of a probable search term is selected and the appropriate request is transmitted to the system 706. The system compiles a sample of the best results of a search for the selected search term and returns those best results to the user 708. The user may now select one of the results in the search sample, thereby opening the result directly. The user may also cancel the search sample and return to the auto-complete results. The user may also request a full search based on the selected search term. The user selects one of the available options and the appropriate request is transmitted to the system 710. The system generates a page based on the user selection and displays the page 712.

The methods described above advantageously provide substantial bandwidth savings over conventional searching systems. Table 1 summarizes experimental results comparing the bandwidth utilization of a typical search using the sample search methods described above, the full search methods, and searching method of conventional search tools.

TABLE 1

Preview search bandwith usage compared to full search methods.

|  | Data Transfer (KB) | Percentage Compared to Preview |
|---|---|---|
| Preview Search | 6.01 | 100.0000% |
| Full Search | 35.98 | 16.7037% |
| Bing | 60.12 | 9.9967% |
| Google (with JavaScript) | 326.73 | 1.8394% |
| Google (without JavaScript) | 101.17 | 5.9405% |

The methods described in this document may, for example, be implemented on a mobile electronic device such as a mobile telephone or smartphone. However, one of ordinary skill in the will recognize that the methods described herein may be implemented on any electronic device that contains electronic circuitry, such one or more processors, computer readable memory and/or media, receiver and transmitter circuitry, one or more antennae, and the like. This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed:

1. A method for conserving bandwidth, the method comprising:
   receiving, at a client device, a user input captured by a human interface device associated with the client device, wherein the user input includes a partial search term comprising at least two words;
   generating a first message by the client device and transmitting the first message to a server, wherein the first message contains the user input, wherein the first message causes the server to determine a plurality of probable search terms by comparing the partial search term to a database of common search terms;
   receiving, at the client device, a second message from the server, wherein the second message contains the plurality of probable search terms, and wherein the second message causes the client device to display, on a display associated with the client device, the plurality of probable search terms in a selectable format that includes a preview link or button associated with each probable search term;
   generating a third message by the client device and transmitting, by the client device, the third message to the server, wherein the third message contains a request for a sample search of a selected probable search term, and wherein the third message was sent by the client device as a result of a user selection of the preview link or button associated with one of the plurality of probable search terms, and wherein the selected probable search term is the one of the plurality of probable search terms associated with preview link or button that was selected, and wherein the third message causes the server to retrieve the sample search, wherein the sample search comprises at least one top result of a search using the selected probable search term, wherein the at least one top result comprises information relating to at least one web page corresponding to the at least one top result; and
   receiving, by the client device, a fourth message from the server, wherein the fourth message contains the sample search associated with the selected probable search term, and wherein the fourth message causes the client device to display, on the display associated with the client device, the sample search results in a selectable format that includes a run search link or button, and wherein selecting one of the sample search results causes a corresponding web page to be loaded,
   wherein transmission of the first, second, third, and fourth messages, in total, requires less bandwidth, at the client device, than transmission of a full search based on the selected probable search term.

2. The method according to claim 1, wherein a graphical user interface displayed on the display associated with the client device further includes a search box where the user input is entered and a search button that is associated with the search box, the method further comprising:
   on a condition that the search button associated with the search box is selected, generating a full search request message by the client device and transmitting the full search request message to the server, wherein the full search request message contains the partial search term, wherein the full search request message causes the server to retrieve a full search wherein the full search contains a plurality of results based on the partial search term;
   receiving, at the client device, a full search response message from the server, wherein the full search response message includes the plurality of results, and wherein the full search response message causes the client device to display, on the graphical user interface, a full search based on the partial search term.

3. The method according to claim 2, wherein the graphical user interface further includes a backslide button that is associated with the search box, the method further comprising:
   on a condition that the backslide button associated with the search box is selected, removing the last word of the at least one partial search term so that the at least one partial search term becomes a shortened partial search term;
   generating a fifth message by the client device and transmitting the fifth message to the server, wherein the fifth message contains updated user input, and wherein the updated user input includes the shortened partial search term comprising one fewer word than the partial search term, and wherein the fifth message causes the server to determine a second plurality of probable search terms by comparing the shortened partial search term to a database of common search terms; and receiving, by the client device, a sixth message from the server, wherein the sixth message includes the second plurality of probable search terms, and wherein the sixth message causes the client device to display, on the display associated with the client device, the second plurality of probable search terms in a selectable format that includes a preview link or button associated with each probable search term.

4. The method according to claim 1, further comprising:

on a condition that the run search link is selected, generating a full search request message by the client device and transmitting the full search request message to the server, wherein the full search request message contains the selected probable search term, wherein the full search request message causes the server to retrieve a full search, wherein the full search contains a plurality of results based on the selected probable search term;

receiving, at the client device, a full search response message from the server, wherein the full search response message includes the plurality of results, and wherein the full search response message causes the client device to display, on the graphical user interface, a full search result based on the selected probable search term.

5. The method according to claim 1, wherein the determining probable search terms occurs on a server remote from the user.

6. The method according to claim 1, wherein the determining probable search terms occurs on a user computing device.

7. A system for providing a preview search of a probable search term prior to executing a full search while conserving bandwidth, the system comprising:

a client device comprising a display and a human interface device, the client device configured to:
  receive a user input captured by a human interface device associated with the client device, wherein the user input includes a partial search term comprising at least two words;
  generating a first message by the client device and transmit the first message to a server, wherein the first message contains the user input;
  receive a second message, in response to the first message, from the server, wherein the second message contains a plurality of probable search terms, and wherein the second message causes the client device to display, on a display associated with the client device, the plurality of probable search terms in a selectable format that includes a preview link or button associated with each probable search term;
  generate a third message, in response to the second message, and transmit the third message to the server, wherein the third message contains a request for a sample search of a selected probable search term, and wherein the third message was sent by the client device as a result of a user selection of the preview link or button associated with one of the plurality of probable search terms, and wherein the selected probable search term is the one of the plurality of probable search terms associated with preview link or button that was selected;
  receive a fourth message, in response to the third message, from the server, wherein the fourth message contains a sample search associated with the selected probable search term, and wherein the fourth message causes the client device to display, on the display associated with the client device, the sample search results in a selectable format that includes a run search link or button, and wherein selecting one of the sample search results causes a corresponding web page to be loaded;

a server comprising an electronic circuit configured to:
  in response to receiving the first message, determine a plurality of probable search terms by comparing the partial search term to a database of common search terms,
  generate and transmit the second message containing the plurality of probable search terms;
  in response to receiving the third message, retrieve the sample search, wherein the sample search comprises at least one top result of a search using the selected probable search term, wherein the at least one top result comprises information relating to at least one web page corresponding to the at least one top result,
  wherein transmission of the first, second, third, and fourth messages, in total, requires less bandwidth, at the client device, than transmission of a full search based on the selected probable search term.

8. The system according to claim 7, wherein a graphical user interface is displayed on the display of the client device, wherein the graphical user interface includes a search button associated with a search box and the client device is further configured to display a full search based on the at least one partial search term on a condition that the search button associated with the search box is selected.

9. The system according to claim 8, wherein a backslide button is associated with the search box and the client device is further configured to remove the last word of the partial search term on a condition that the backslide button associated with the search box is selected.

10. The system according to claim 9, wherein the client device is further configured to display a full search result based on the selected probable search term on a condition that the run search link is selected in the preview search.

* * * * *